United States Patent [19]

Habata et al.

[11] 4,414,052

[45] Nov. 8, 1983

[54] POSITIVE-TEMPERATURE-COEFFICIENT THERMISTOR HEATING DEVICE

[75] Inventors: Etsuroh Habata, Ikoma; Nobumasa Ohshima, Hirakata; Kenji Kanatani, Kadoma, all of Japan

[73] Assignee: Matsushita Electric Industrial Co., Ltd., Osaka, Japan

[21] Appl. No.: 333,917

[22] Filed: Dec. 23, 1981

[30] Foreign Application Priority Data

Dec. 26, 1980 [JP] Japan ............................... 55-186490
Dec. 26, 1980 [JP] Japan ............................... 55-186494

[51] Int. Cl.³ ........................ B32B 31/20; H01C 7/02; H05B 3/30

[52] U.S. Cl. .................................. 156/273.7; 29/611; 156/252; 156/273.9; 156/274.8; 156/275.5; 156/275.7; 156/295; 156/307.3; 156/307.7; 165/185; 219/505; 219/540; 219/553; 338/22 R

[58] Field of Search .................. 156/252, 273.7, 273.9, 156/274.8, 275.5, 275.7, 295, 307.3, 307.7; 219/209, 504, 505, 530, 540, 553; 338/22 R, 22 SD; 29/611; 165/80 B, 183, 185

[56] References Cited

U.S. PATENT DOCUMENTS

| | | | |
|---|---|---|---|
| 3,261,396 | 7/1966 | Trunk | 165/80 B |
| 3,397,278 | 8/1968 | Pomerantz | 156/273.9 |
| 3,996,447 | 12/1976 | Bouffard et al. | 219/540 |
| 4,151,547 | 4/1979 | Rhoades et al. | 165/185 |
| 4,341,949 | 7/1982 | Steiner et al. | 219/540 |
| 4,352,008 | 9/1982 | Höfer et al. | 219/540 |

*Primary Examiner*—Michael G. Wityshyn
*Attorney, Agent, or Firm*—Burgess, Ryan & Wayne

[57] ABSTRACT

A positive-temperature-coefficient (PTC) thermistor heating element in which joints between metal heat radiating means and the electrodes on a positive-temperature-coefficient thermistor element are attained only with an electrically insulative adhesive in such a way that prior to and during the curing step, the heat radiating means are pressed against the electrodes to establish thereby electrical contacts at least partially between them. The heat radiating means also function as current paths to and out, respectively, of the thermistor element. The PTC thermistor heating device is simple in construction and easy to fabricate at less cost yet has a high and stable thermal output.

3 Claims, 16 Drawing Figures

POSITIVE-TEMPERATURE-COEFFICIENT THERMISTOR HEATING DEVICE

BACKGROUND OF THE INVENTION

The present invention relates to a positive-temperature-coefficient (PTC) thermistor heating device which has a high and stable thermal output and a process for fabricating the same.

Use of positive-temperature-coefficient (abbreviated as "PTC" in this specification) thermistor elements as heat sources are advantageous in that because of their "self-temperature-control action", overheating can be avoided and temperature variations are minimum. The thermal output (W) of a PTC thermistor is given by $$W=C(T-T_a)$$

where C = a coefficient of heat or thermal radiation,

T = a surface temperature of the thermistor, and $T_a$ = an ambient temperature.

The surface temperature T of a PTC thermistor element becomes almost constant at or in the proximity of a Curie point of the thermistor element, so that in order to increase the thermal output W, the coefficient of heat or thermal radiation C must be increased. To this end, it has been a universal practice to join to the electrodes on a PTC thermistor element heat radiating means which are made of a metal or a metal alloy and which serve to increase the coefficient of thermal radiation C.

However, the prior art PTC thermistor heating device with metal heat radiating means have problems to be described below.

(1) In order to join metal heat radiating means to the electrodes of a PTC thermistor element to obtain thereby the highest thermal output, the surfaces of contact between the heat radiating means and the electrodes of the thermistor element must be ground and/or polished flat so that they are in very intimate contact with each other. As a result, the fabrication steps are increased in number with a resultant increase in fabrication costs.

(2) In some types of PTC thermistor heating devices, a bias spring is used to press the metal heat radiating means against the electrodes on the PTC thermistor element. However, the bias spring is easily susceptible to thermal fatigue, so that the biasing force applied to the metal heat radiating means is reduced.

(3) In some types of PTC thermistor heating devices, a PTC thermistor element, metal heat radiating means and a bias spring are mounted in an insulation frame. The frame is subjected to thermal creep due to temperature variations so that the pressure of contact between the metal heat radiating means and the PTC thermistor element varies and consequently the internal electrical resistance and hence the thermal output of the heating element varies.

(4) In some types of PTC thermistor heating devices, a bond between a PTC thermistor element and metal heat radiating means is obtained with an adhesive which is electrically conductive. However, such an adhesive as described above is very expensive. In addition, the adhesive bond is easily susceptible to breakage due to mechanical impact or vibration. Furthermore, if the adhesive drips or is squeezed out to bridge across electrically isolated parts, short-circuits result.

SUMMARY OF THE INVENTION

In view of the above, a first object of the present invention is to provide a PTC thermistor heating element with a high and stable thermal output.

Another object of the present invention is to provide a process for fabricating a PTC thermistor heating devices with a high and stable thermal output which are simple in construction, rugged in construction and easy to fabricate at low costs.

A further object of the present invention is to provide a method for attaining strong adhesive bonds between a PTC thermistor element and metal heat radiating means in a very simple manner in such a way that both the electrical and thermal contact resistances between them can be held to minimum.

According to one embodiment of the present invention, bonds between a PTC thermistor element and heat radiating means are attained with an electrically insulative adhesive. Prior to and during the curing step, the metal heat radiating means are pressed against the PTC thermistor so that satisfactory physical, electrical and thermal contacts can be established therebetween.

In the process of the present invention, it is preferable to use thermally curable adhesives and more preferable to use adhesives which are electrically insulative and have a curing temperature at or in the proximity of a Curie point of a PTC thermistor element so that the adhesives can be cured by heat produced by the thermistor element when the latter is electrically energized during the curing step, whereby a cure time becomes shorter.

According to the present invention, it is rather preferable that the surfaces of contact of either or both of the electrodes on a PTC thermistor element and metal heat radiating means have minute surface irregularities.

The above and other objects, effects and features of the present invention will become more apparent from the following description of preferred embodiments thereof taken in conjunction with the accompanying drawings.

DETAILED DESCRIPTION OF THE PRIOR ART

Figure 1:
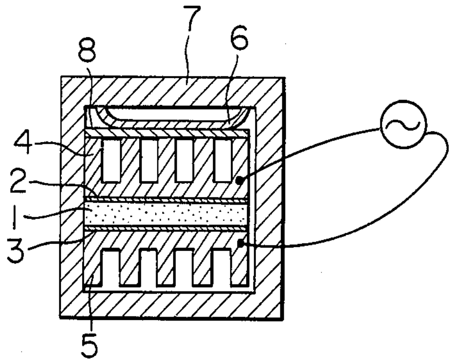
FIG. 1 PRIOR ART
FIG. 1 shows in elevation-section a first type of the prior art PTC thermistor heating element.
Figure 2:
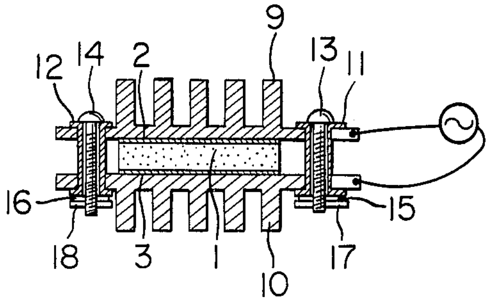
FIG. 2 PRIOR ART
FIG. 2 shows in elevation-section a second type of the prior art PTC thermistor heating element.
Figure 3:
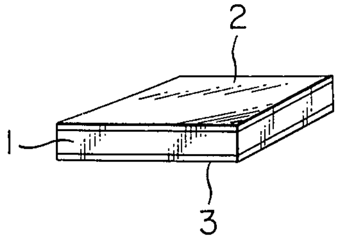
FIG. 3 PRIOR ART
FIG. 3 is a perspective view of a PTC thermistor element used in the heating element as shown in FIG. 1 or 2.

In FIGS. 1 and 2 are shown in elevation-section prior art positive-temperature-coefficient (PTC) thermistor heating devices, respectively, and in FIG. 3 is shown in perspective a thermistor thereof. Reference numeral 1 denotes a thermistor element with a positive temperature coefficient and electrodes 2 and 3 deposited or otherwise formed over the opposite major surfaces, respectively, thereof. For instance, the electrodes 2 and 3 can be formed by aluminum spraying or nickel plating. The thermistor element 1 is sandwiched by fin-shaped heat radiators 4 and 5 or 9 and 10 which are made of a metal or an alloy such as aluminum which exhibits a high thermal conductivity and is low in cost. The heat radiators 4 and 5 or 9 and 10 are fin-shaped so that they can have large heat transfer surfaces.

In the case of the thermistor heating device as shown in FIG. 1, the thermistor element 1 and the heat radiators 4 and 5 are mounted in a ceramic or porcelain insulation frame 7 and are maintained in position under the force of a bias spring 6 made of stainless steel. A spacer 8 made of sheet metal is placed between the heat radiator 4 and the bias spring 6.

In the case of the thermistor heating device as shown in FIG. 2, the bases of the heat radiators 9 and 10 are formed with holes adjacent to the opposing sides. The holes in the upper radiator 9 are aligned with those in the lower radiator 10 and insulating bushings 11 and 12 are inserted into the aligned holes and then bolts 13 and 14 are inserted into the bushings 11 and 12, respectively, and fitted with spring locking washers 15 and 16, respectively. Thereafter, nuts 17 and 18 are tightened, whereby the thermistor element 1 can be securely clamped between the upper and lower heat radiators 9 and 10.

When a voltage is applied between the upper and lower heat radiators 4 and 5 or 9 and 10, the thermistor element 1 dissipates heat which the heat radiators 4 and 5 or 9 and 10 receive and dissipate or radiate to the surrounding atmosphere. Thus, the PTC thermistor heating element can produce a large quantity of heat. Since the heat source is the PTC thermistor element 1, the heating element can exhibit self-temperature-controllability; that is, the ability to control the temperature by itself, so that it will not overheat and consequently is very safe.

In order to increase the heat generating capacity, the thermal resistance between the thermistor element 1 on the one hand and the metal heat radiators 4, 5, 9 and 10 must be reduced as much as possible. However, in the prior art thermistor heating elements of the types as shown in FIGS. 1 and 2, the surfaces of contacts of the thermistor element 1 and the radiators 4, 5, 9 and 10 are not flat; that is, they are deflected or curved so that the intimate contact between them cannot be attained and consequently the areas of contacts between them become smaller. This is the most adverse problem in attempting to reduce the thermal resistance at the interfaces between the thermistor element 1 and the heat radiators 4, 5, 9 and 10. To solve this problem, the surfaces of contact of the thermistor element 1 and the heat radiators 4, 5, 9 and 10 are polished or ground flat so that they can be brought into very intimate contact with each other. In addition, a bias means such as the bias spring 6 is used to ensure further intimate contact between them.

In sum, in the case of the prior art thermistor heating device, the surfaces of contact of the thermistor element and the heat radiators must be ground or polished flat so that the heat radiators, which are made of a metal such as aluminum, can exhibit their heat transfer abilities to a maximum extent and consequently a maximum quantity of heat can be derived from the thermistor heating element. As a result, the fabrication steps are increased in number with the inevitable result of the increase in cost. In addition, when the bias spring 6 is used as shown in FIG. 1, it is heated, so that it is thermally fatigued. Furthermore, the insulation frame 7 is also subjected to thermal creep. As a result, the force applied from the bias spring 6 to the upper heat radiator 4 changes with the resultant variations in available heat.

Figure 4:
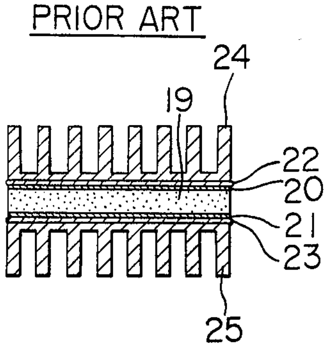
FIG. 4 PRIOR ART
FIG. 4 is a longitudinal sectional view of a third type of the prior art PTC thermistor heating element.

A further example of the prior art PTC thermistor heating device is shown in longitudinal section in FIG. 4. Opposite major surfaces of a PTC thermistor element 19 are formed with electrodes 20 and 21 by, for instance, aluminum spraying. Heat radiators 24 and 25 which are made of a metal such as aluminum are securely bonded to the electrodes 20 and 21, respectively, with an electrically conductive adhesive comprising, for instance, a mix of an epoxy adhesive and silver particles. The layers of the adhesive are indicated by 22 and 23.

Since the thermistor element 19 and the heat radiators 24 and 25 are securely joined to each other through the adhesive layers 22 and 23, very intimate contact between them can be ensured even when the surfaces of contact thereof are not completely flat. The reason is that the adhesive fills any space left between them. As a result, the thermal resistance across the boundaries between the thermistor element 19 and the heat radiators 23 and 24 can be reduced. In other words, satisfactory thermal coupling can be ensured between them without grinding or polishing their surfaces contact flat. In addition, the joint means such as bolts, 13 and 14, washers 15 and 16, nuts 17 and 18, bias spring 6 and insulation frame 7 as shown in FIGS. 1 and 2 can be eliminated. As a consequence, the number of component parts can be reduced with the resultant reduction in cost.

However, the prior art heating element as shown in FIG. 4 still has some defects due to the use of an electrically conductive adhesive for bonding between the thermistor element 19 and the heat radiators 23 and 24. Firstly, a relatively large quantity of silver particles must be added to an adhesive so that the fabrication cost is inevitably increased. Secondly, electrically conductive adhesives generally exhibit poor adhesive or bond strength so that the thermistor heating element becomes easily susceptible to breakdown due to mechanical vibration or impact. Thirdly, if an adhesive drips or spills over nonbonding surface areas or if too much adhesive is squeezed out of the bond line and if it is cured to bridge between, for instance, the upper and lower heat radiators 24 and 25, the latter are short-circuited.

DESCRIPTION OF THE PREFERRED EMBODIMENTS

The present invention was made to overcome the above and other problems encountered in the prior art thermistor heating device.

First Embodiment, FIGS. 5-8

Figure 5:
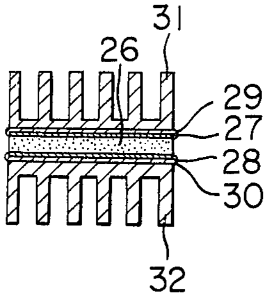
FIG. 5 is a longitudinal sectional view of a first embodiment of the present invention.
Figure 6:
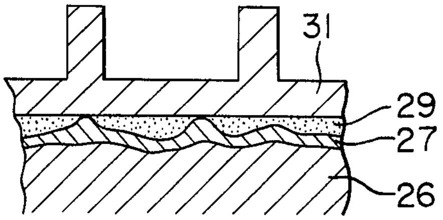
FIG. 6 is a fragmentary view, on enlarged scale, thereof.
Figure 8:
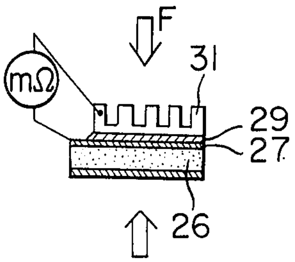
FIG. 8 is a view used to explain the steps for fabricating the PTC thermistor heating element as shown in FIG. 5.

Referring first to FIGS. 5, 6 and 8, a thermistor element 26 has aluminum electrodes 27 and 28 deposited over the opposite major surfaces, respectively, by metal spraying or the like. Heat radiators 31 and 32, which are made of a suitable metal such as aluminum, are securely joined to the electrodes 27 and 28, respectively, with an insulation adhesive of a silicon or epoxy derivative. The adhesive layers between the electrodes and the heat radiators are indicated by 29 and 30. In the bonding step, the heat radiators 31 and 32 are pressed against the electrodes 27 and 28, respectively, while the adhesive layers 29 and 30 are being cured.

The bond between the upper electrode 27 and the upper heat radiator 31 is fragmentary, as shown in enlarged scale in FIG. 6. When microscopically viewed, both the surfaces of contact of the electrode 27 and the heat radiator 31 have many minute surface irregularities, but when the heat radiator 31 is firmly pressed against the electrode 27 with the insulation adhesive 29 therebetween in the bonding step as described previously, the adhesive 29 fills the minute voids left between the electrode 27 and the heat radiator 31 and the direct electrical contact between them can be maintained as shown in FIG. 6 and as will be described in detail below.

Figure 7:
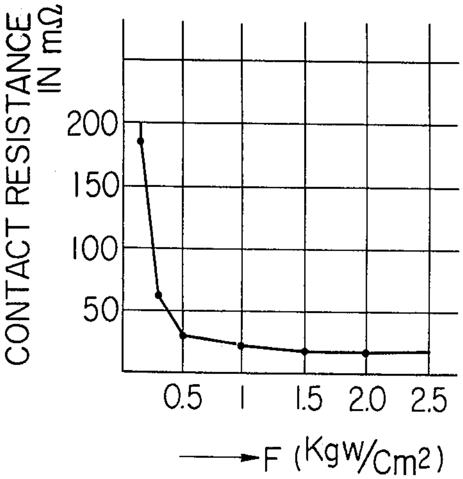
FIG. 7 shows the electrical contact resistance between a heat radiator as shown in FIG. 5 or 6 and a PTC thermistor element as a function of the pressure which is applied to the heat radiator to press it against the thermistor element with an insulation adhesive interposed therebetween.

In FIG. 7 the contact resistance in mΩ is plotted as a function of the pressure F in kg w/cm$^2$ applied to the heat radiator as shown in FIG. 8 in the bonding step. The data was obtained by an experimental design as shown in FIG. 8. The aluminum electrodes 27 and 28 are 30∼50 μm in thickness and a silicon adhesive with a viscosity of 200 poises is used. The thermistor element 26 is 10 mm×30 mm×2.8 mm in size. The heat radiators 31 and 32 are made of aluminum. From FIG. 7 it is apparent that if the force F in excess of 0.5 kg w/cm$^2$ is applied to the heat radiators 31 and 32, satisfactory electrical contacts between the electrodes 27 and 28 and the heat radiators 31 and 32 can be ensured even when the insulation adhesive layers 29 and 30 are interposed between them. The heat radiators 31 and 32 thus electrically connected to the electrodes 27 and 28, respectively, also function as a current feeder.

If an insulation adhesive capable of being cured at or in the proximity of a Curie point of the thermistor element 26 is used, the bonding step can be much simplified and accomplished within a short time. The bonding steps are as follows. First, an adhesive of the type just described above is applied to the electrodes 27 and 28 and then the heat radiators 30 and 31 are pressed against the electrodes 27 and 28 while a voltage is applied to the thermistor element 26 directly or through the heat radiators 30 and 31 so that the thermistor element 26 produces heat. After the adhesive has been completely cured, the forces F are removed and the voltage applied is turned off. Thus, the heat radiators 31 and 32 can be securely bonded to the electrodes 27 and 28, respectively.

Next, some experimental results will be described. When a two-part silicon adhesive, which is electrically insulating, is used, a cure time is longer than 20 minutes in a hot air blast oven at 190° C. According to the present invention the above-described silicon insulation adhesive is used in bonding aluminum heat radiators over a thermistor element which has a Curie point of 200° C., exhibits an electrical resistance of 100Ω at room temperature and is 10 mm and 30 mm on sides and 2.8 mm in thickness. In the curing step, the heat radiators are pressed against the thermistor element with the layers of the adhesive therebetween while a voltage of 60 V is applied across the thermistor element. The curing is initiated after about 20 seconds and is completed in one minute.

As described above, the cure time can be considerably shortened according to the present invention. The reason is that if a hot blast oven is used in the curing step, it takes a long time before the temperature of an adhesive used reaches a predetermined level because of the thermal capacities of jigs, PTC thermistor elements and metal fin radiators. On the other hand, according to the present invention, a thermistor element itself is caused to heat so that an adhesive in direct contact therewith can be directly heated. As a result, the heating or cure time can be shortened considerably. In addition, according to the present invention, it is not needed to heat jigs and other associated parts so that the power consumption can be remarkably reduced. Furthermore, the adhesive can be uniformly cured so that the qualities of finished products can be improved. Thus, according to the present invention, energy savings can be attained; the fabrication costs can be reduced; and high qualities can be ensured.

In the first embodiment, the heat radiators have been described so far as having fins, but it is to be understood that the present invention is not limited to them. For instance, the present invention can use apertured, diecast radiators, corrugated heat-transfer plates or flat heat-transfer plates. So far, the thermistor elements have been described as being in the form of a rectangle, but thermistor elements in any suitable shape such as a polygon, a disk or a ring can be used equally.

The first embodiment of the present invention may be summarized as follows. It is not needed to grind or polish the surfaces of contact of electrodes and heat radiators, but with the use of a heat-insulation adhesive, the electrodes of the thermistor element and the heat radiators can be securely joined to each other when the adhesive is thermally cured as described above. Thus, according to the present invention, positive-temperature coefficient (PTC) thermistor heating devices with a high heat producing ability can be fabricated in a very simple manner. In addition, the use of expensive electrically conductive adhesives such as an adhesive mixed with silver particles can be avoided and the electrodes and the heat radiators can be securely joined with each other with an inexpensive insulation adhesive by pressing the radiators against the electrodes while the adhesive is thermally cured. Thus, the PTC thermistor heating element which is simple in construction yet highly efficient in operation can be provided at less costs. Furthermore, according to the present invention, electrically insulative adhesives are used so that even if they adhere to nonbonding areas in small quantity or they are squeezed out of the bond line, short-circuits due to bridging between discrete parts by the adhesive can be avoided. As a consequence, the handling of the adhesive can be much facilitated and jigs simple in construction can be used. Thus, the assembly steps can be much decreased in number as compared with the assembly of the prior art thermistor heating elements.

Moreover, the present invention uses electrically insulative adhesives which can cure themselves at temperatures at or in the proximity of a Curie point of thermistor elements and a voltage is applied across each of the thermistor elements in the curing step so that the adhesive can be easily cured by the heat dissipated from the thermistor elements.

Second Embodiment, FIGS. 9–12

Referring next to FIGS. 9–12, a second embodiment of the present invention and some modifications thereof will be described. According to the second embodiment, the surfaces of a PTC thermistor element are previously treated so that they have surface irregularities of suitable sizes and configurations so that the finished product can have uniform characteristics and is highly reliable and dependable in operation.

Figure 9:
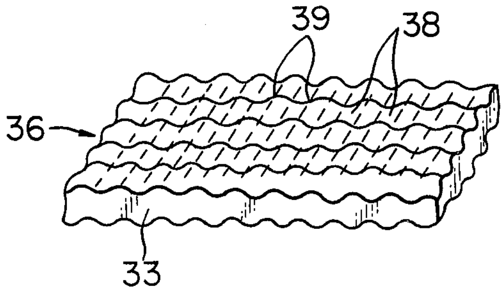
FIG. 9 is a partial perspective view of a PTC thermistor element used in a second embodiment of the present invention.
Figure 10:
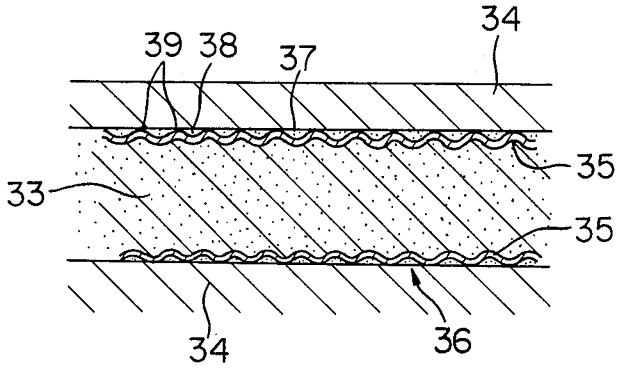
FIG. 10 is a fragmentary longitudinal sectional view thereof illustrating the adhesive bonds between metal heat radiators and the PTC thermistor element.

Referring first to FIGS. 9 and 10, as with the thermistor element as shown in FIG. 3, a PTC thermistor element 33 has aluminum electrodes 35 formed over the opposite major surfaces thereof by a suitable metal deposition process such as metal spraying. Each of the electrodes 35 has a checkerboard-like raised pattern 36 formed in the surface. As best shown in FIG. 9, the uniformly raised pattern can be formed by corrugating at the same pitch both in the lengthwise and widthwise directions; that is, mutually orthogonally. In this embodiment, the depth of the corrugations; that is, the vertical distance between the crest of the ridge and the bottom of the furrow is of the order of 0.5 mm.

In the bonding step, an insulation adhesive 37 is applied over the mutually orthogonally corrugated surface of the electrode 35 and a heat radiator 34, which is made of a metal such as aluminum, is pressed against the electrode. Then, the adhesive 37 is forced into the furrows 38 while the ridges 39 are made into intimate contact with the surface of the heat radiator 34. In this case, the overall area of contact between the ridges 39 and the surface of the heat radiator 34 as well as that between the adhesive 37 and the surface of the radiator 34 can be controlled by controlling the pressure applied to the radiator 34 when the adhesive 37 is cured.

In this case, as the pressure is applied, the adhesive between the ridges 39 and the surface of the radiator 39 can be completely squeezed out, the intimate electrical and thermal contact between them can be ensured.

Figure 11:
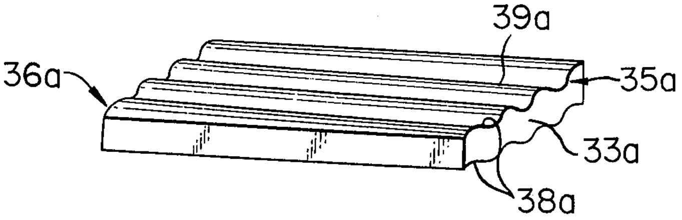
FIGS. 11 and 12 are perspective views, respectively, of first and second modifications of the second embodiment.

In a first modification of the second embodiment shown in FIG. 11, the surface of the electrode $35_a$ of the thermistor element $33_a$ is corrugated lengthwise. The first modification has an advantage in that even when the crests of the ridges $39_a$ vary in height, they can be made into more intimate contact with the surface of the radiator 34 when the pressure is applied between them, whereby the highly reliable electrical and thermal contact between them can be ensured.

In the second embodiment, the raised portions or hills are arrayed like a checkerboard as best shown in FIG. 9 and the applied adhesive 37 fills the furrows or valleys 38 around the ridges or hills 39. When the pressure is applied to the heat radiator 34 during the curing step, the crest or top of each hill 39 is collapsed to some extent and the adhesive 37 in the surrounding furrows or valleys 38 is exerted with the compressive force. As a result, the reaction force acts on the surface of the heat radiator, cancelling some compression pressure applied thereto. According to the first modification, however, the electrode $35_a$ is corrugated lengthwise only so that when the heat radiator is pressed against the electrode $35_a$, excessive adhesive 37 is smoothly squeezed out of the bond line through the straight furrows $38_a$ so that the reaction force is reduced and consequently the reduction in compressive pressure can be minimized.

Figure 12:
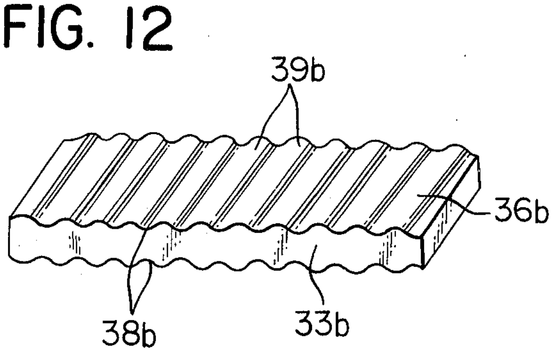

In FIG. 12 is shown a second modification of the second embodiment wherein the electrode surface $39_b$ of a thermistor element $36_b$ is corrugated widthwise only. This means that the length of the furrows $38_b$ is shorter than that of the furrows $38_a$ of the first modification as shown in FIG. 11 so that the adhesive 37 can be more smoothly squeezed out of the bond line when the compressive force is applied to the heat radiator and consequently the reduction in compressive force can be avoided almost completely. As a result, a highly reliable electrical and thermal contact can be established between the ridges $39_b$ of the thermistor element $36_b$ and the heat radiators and consequently the heat transfer efficiency between the thermistor element $36_b$ and the heat radiators is increased. Thus, the thermistor heating element with a high thermal output can be provided.

So far, the mutually orthogonal, lengthwise or widthwise corrugation is formed in each of the electrode surfaces of the thermistor element 36, but it is to be understood that the surfaces of contact of the upper and lower heat radiators 34 can be corrugated in a manner substantially similar to that described above.

In summary, according to the second embodiment of the present invention, the surfaces of contact of the thermistor element 33 or the heat radiators 34 are previously corrugated mutually orthogonally, lengthwise or widthwise so that very intimate and highly reliable electrical and thermal joints between the thermistor element and the radiators can be ensured. As a result, the thermistor heating element with a high thermal output can be provided.

Figure 13:
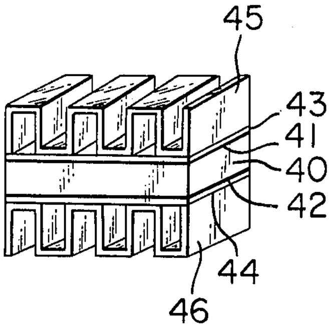
FIG. 13 is a perspective view of a third embodiment of the present invention.
Figure 14A:
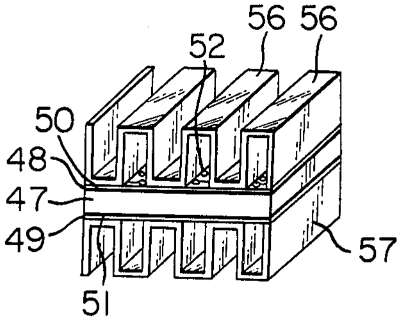
FIGS. 14A, 14B and 15 are views used to explain a modification thereof.
Figure 14B:
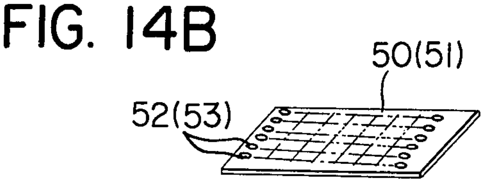
Figure 15:
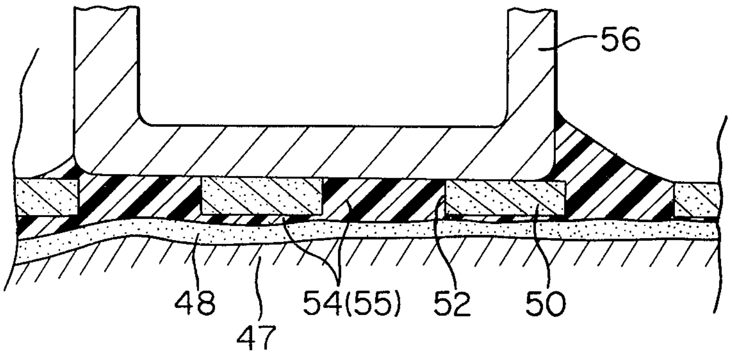

Third Embodiment, FIGS. 13–15

Referring next to FIGS. 13–15, a third embodiment of the present invention will be described which can ensure more secure and rigid bond between the thermistor element and the heat radiators.

Referring first to FIG. 13, a PTC thermistor element 40 has aluminum electrodes 41 and 42 formed over the opposite major surfaces thereof. In the third embodiment, radiators 45 and 46 are in the form of a straight corrugated fin of aluminum and are slightly greater in thickness than aluminum contact plates 43 and 44 interposed between the electrodes 41 and 42 and the heat radiators 45 and 46. With an insulation adhesive (not shown) whose curing temperature is at or in the proximity of a Curie point of the thermistor element 40, the electrodes 41 and 42, the contact plates 43 and 44 and the heat radiators 45 and 46 are bonded together.

Since the thin contact plates 43 and 44 are interposed between the heat radiators 45 and 46, which are in the form of a corrugated fin, intimate and highly reliable thermal contacts between the thermistor element 40 and the heat radiators 45 and 46 can be ensured. In addition, the thin aluminum contact plates 43 and 44 can compensate for deflections, curvatures, minute irregularities or waviness in the surfaces of contact of the thermistor element 40 and the heat radiators 45 and 46. As a consequence, the efficiency of heat-transfer between the thermistor element 40 and the heat radiators 45 and 46 can be improved. As with the first or second embodiment, a voltage is applied across the upper and lower heat radiators 45 and 46 to energize the thermistor element 40.

Next, referring to FIGS. 14A, 14B and 15, a modification of the fourth embodiment will be described. In the bonding step of the third embodiment, the adhesive must be applied twice; that is, first to the electrode surface of the thermistor element for bonding it to the thin contact plate and then to the free surface of the thin contact plate for bonding it to the heat radiator. However, according to the modification of the third embodiment, the bonding among the thermistor element, the thin contact plates and the heat radiators can be accomplished by one step as will be described in detail below, whereby the number of assembly steps can be reduced with the resultant reduction in fabrication cost.

Since the construction of the modification is symmetrical with respect to the center plane of a thermistor element 47 as best shown in FIG. 14A, only the upper half of the construction will be described and the corresponding parts in the lower half are indicated by reference numeral in parentheses.

A PTC thermistor element 47 has an aluminum electrode 48 (49) formed over the upper major surface thereof. A thin aluminum contact plate 50 (51) is 0.2 mm in thickness and perforated or formed with a large number of apertures 52 (53) which are arrayed in rows and columns at a suitable pitch as best shown in FIG. 14B. Alternatively, the apertures 52 (53) can be staggered in zig-zag form. An aluminum heat radiator 56 (57) is in the form of a straight corrugated fin and is 0.5 mm in wall thickness. To bond the thermistor element 47, the thin contact plate 48 and the heat radiator 56, an insulation adhesive with a curing temperature at or in the proximity of a Curie point of the thermistor element 47 is applied to the electrode surface 48 (49) of the element 47. When the thin contact plate 50 (51) and the heat radiator or corrugated fin 56 (57) are stacked in the order named and the compressive pressure is applied the adhesive is spread and squeezed through the apertures 52 (53) as indicated by 54 (55) in FIG. 15 and the adhesive 54 (55) squeezed out of these apertures 52 (53) bonds between the thin contact plate 50 (51) and the heat radiator 56 (57). Thus, the electrical and thermal contact between the thermistor element 47 and the radiator 56 (57) can be established through the thin contact plate (50). In operation and in the bonding step as well, a voltage is applied between the upper and lower heat radiators 56 and 57 to energize the thermistor element 47.

For the sake of better understanding of the assembly of the modification of the third embodiment, it will be described in more detail below. First, the adhesive 54 (55) is applied over the electrode 48 (49) of the thermistor element 47 and then the thin contact plate 50 (51) with small apertures 52 (53) is superimposed. This step is followed by the step of placing the heat radiator 56 (57) over the thin contact plate 50 (51). Thereafter, the compressive force is applied to force the heat radiator 56 (57) and the thin contact plate 50 (51) against the thermistor element 47. Then, the adhesive 54 (55) is not only spread between the thermistor element 47 and the lower surface of the thin contact plate 50 (51) but also is squeezed out through the apertures 52 (53) of the plate 50 (51) to make into contact with the radiator 56 (57) as best shown in FIG. 15. Thus, it suffices to apply the adhesive 54 (55) only once. Thereafter, the adhesive 54 (55) is cured in the manner described previously.

So far, the adhesive have had to be applied twice, but according to this modification, it suffices to apply it only once as described previously. As a result, the number of assembly steps can be reduced and in addition the automation is facilitated. Furthermore, the adhesive squeezed out of the bond line between the thin contact plate 50 (51) and the thermistor element 47 through the apertures 52 (53) remains in them even after the adhesive has been cured so that a strong and highly reliable bond can be attained between the thermistor element 47 and the heat radiator 56 (57).

The experimental data showed that the efficiency of heat-transfer between the thermistor element 47 and the heat radiator 56 (57) through the thin, apertured contact plate 50 (51) is substantially same with that attainable by the third embodiment as shown in FIG. 13.

In summary, according to the modification of the third embodiment of the present invention, the adhesive application can be accomplished by one step because when the compressive pressure is applied to the heat radiator 56 (57) to press it and the thin, apertured contact plate 50 (51) against the electrode surface 48 (49) of the thermistor element 47, the adhesive 54 (55) applied to the surface 48 (49) for bonding it to the lower surface of the thin, apertured contact plate 50 (51) is forced through the apertures 52 (53) and made into contact with the bottom surfaces of the heat radiator or corrugated fin 56 (57). Thus, the overall number of assembly steps can be reduced at least by one and even through thin, apertured contact plates 50 and 51 are used, the high efficiency of heat-transfer and the highly reliable strong bond between the thermistor element 47 and the heat radiators 56 and 57 can be ensured.

So far, the radiators 56 and 57 have been described and shown as being in the form of a straight corrugated fin, but it is to be understood that they may be a wavy or herringbone pattern when special applications are required.

In summary, according to the present invention, the thermistor heating element which has a high thermal output can be fabricated in a very simple manner at less costs.

What is claimed is:

1. A process for fabricating positive-temperature-coefficient thermistor heating devices characterized by the steps of (a) applying an adhesive to the surfaces of electrodes formed over the opposite major surfaces of a positive-temperature-coefficient thermistor element, said adhesive being electrically insulative;

(b) placing heat radiating means, which are made of a metal, over and pressing them against said electrodes, respectively, of said positive-temperature coefficient thermistor element with said adhesive therebetween in such a way that direct contacts without the inclusion or presence of said adhesive can be at least partially established between the surfaces of contact between said electrodes of said positive-temperature-coefficient thermistor element and said heat radiating means; and (c) curing said adhesive to bond said positive-temperature-coefficient thermistor element and said heat radiating means together, said heat radiating means functioning as current paths, respectively, to and away from said positive-temperature-coefficient thermistor element.

2. A process for fabricating positive-temperature-coefficient thermistor heating devices characterized by (a) preparing an adhesive which is electrically insulative and has a curing temperature equal to or in the proximity of a Curie point of a positive-temperature-coefficient thermistor element having electrodes formed over the opposite major surfaces thereof;
(b) applying layers of said adhesive over the surfaces of said electrodes, respectively, of said positive-temperature-coefficient thermistor element;
(c) placing heat radiating means, which are made of a metal thereof, over and pressing them against said electrodes of said positive-temperature-coefficient thermistor element with said layers of said adhesive therebetween in such a way that direct contacts without interposition of said adhesive can be at least partially established between said electrodes of said positive-temperature-coefficient thermistor element and said heat radiating means; and
(d) while maintaining the state as defined in said step (c), applying a voltage across said positive-temperature-coefficient thermistor element to thereby heat it to temperatures close to said Curie point thereof, thereby thermally curing said layers of said adhesive to bond between said positive-temperature-coefficient thermistor element and said heat radiating means, said heat radiating means functioning as current paths, respectively, to and out of said positive-temperature-coefficient thermistor element.

3. A process for fabricating positive-temperature-coefficient thermistor heating devices of the type in which heat radiating means are bonded to electrodes formed over the opposite major surfaces of a positive-temperature-coefficient thermistor element through a thin contact plate therebetween with an adhesive which is electrically insulative, said heat radiating means and the thin contact plates being made of a metal thereof and the thin contact plates being smaller in thickness than said heat radiating means, said heat radiating means and said thin contact plates or said thin contact plates functioning as current paths, respectively, to and away from said positive-temperature-coefficient thermistor element, said process characterized by (a) forming each of said thin contact plates with a multitude of small apertures;
(b) applying said adhesive to the surface of each of said electrodes of said positive-temperature-coefficient thermistor element;
(c) stacking each of said thin contact plates with a multitude of small apertures and said heat radiating means in the order named over said each of said electrodes of said positive-temperature-coefficient thermistor element with said adhesive between said each of said electrodes thereof and the lower surface of said each of said thin contact plates;
(d) applying pressures to said heat radiating means to press them and said thin contact plates to said positive-temperature-coefficient thermistor element so that the adhesive is squeezed through said small apertures of said thin contact plates and made into intimate contact with said heat radiating means and that direct contacts without the presence of said adhesive can be at least partially established between the electrodes of the positive-temperature-coefficient thermistor element and the lower surfaces in opposite relation therewith of said thin contact plates; and
(e) curing said adhesive while maintaining the condition as defined in the step (d) is maintained, whereby said positive-temperature-coefficient thermistor element, said thin contact plates and said heat radiating means are rigidly bonded together.

* * * * *